(12) United States Patent
Beaudoin et al.

(10) Patent No.: US 6,521,768 B2
(45) Date of Patent: Feb. 18, 2003

(54) PROCESS FOR THE EXTRACTION OF LIPIDS FROM FATTY BIRD TISSUES

(76) Inventors: Adrien Beaudoin, 748, boul des Vétérans, Rock Forest, Quebec (CA), J1N 1Z7; Geneviève Martin, 660, Côte Ste-Geneviève #2, Quebec, Quebec (CA), G1R 3K5

( * ) Notice: Subject to any disclaimer, the term of this patent is extended or adjusted under 35 U.S.C. 154(b) by 0 days.

(21) Appl. No.: 10/037,086

(22) Filed: Nov. 9, 2001

(65) Prior Publication Data

US 2002/0133033 A1 Sep. 19, 2002

(30) Foreign Application Priority Data

Nov. 14, 2000 (CA) .............................................. 2325377

(51) Int. Cl.⁷ .................................................. C07C 1/00
(52) U.S. Cl. .................................... 554/14; 8/12; 8/13
(58) Field of Search ................................ 554/8, 12, 13, 554/14

Primary Examiner—Deborah D. Carr
(74) Attorney, Agent, or Firm—Eric Fincham

(57) ABSTRACT

A method for the extraction of lipids from lipid containing tissues of a member of the bird species such as the ratite, gallinaceous or anatidae wherein the lipid containing tissues are comminuted and the lipids extracted in a solvent, preferably acetone or ethyl acetate, to provide a liquid fraction and a solid fraction and subsequently removing the solvent from the liquid fraction to provide a lipid rich component.

9 Claims, No Drawings

PROCESS FOR THE EXTRACTION OF LIPIDS FROM FATTY BIRD TISSUES

This present invention relates to a method for the recovery of lipids from bird tissues.

Birds possess varying amounts of fat tissue under their skin and in their peritoneal cavity. The recovery of the oil or lipids from the lipid containing tissues of birds is desirable for various uses such as a nutriment, nutraceutical or cosmetic.

The known methods for recovering lipids from lipid containing tissues of birds usually comprises the heating of the lipid containing tissues once they have been removed from the bird.

In general, the fatty tissues from birds which are raised for food purposes are collected in slaughterhouses. Today, fat in generally has a bad reputation and accordingly it is frequently considered as waste or a low value product. This reputation derives in part from the fact that the fats are often contaminated by bacteria such as salmonella. Accordingly, often the fats are frequently subjected to a heat treatment and at a relatively high temperature to destroy any bacteria. This results in oxidation of the unsaturated lipids.

Certain oils derived from certain birds are considered to have a higher value. Thus, emu oil is taught in the art to have certain desirable characteristics. One desirable characteristic of emu oil is that it is particularly low in cholesterol.

It is an object of the present invention to provide a method for the extraction of lipids from lipid containing tissues of birds and which preserves the quality of the lipids.

According to one aspect of the present invention, there is provided a method for the extraction of lipids from lipid containing tissues of a member of the bird species, the method comprising the steps of comminuting the lipid containing tissues, placing the comminuted lipid containing tissues in a solvent for a period of time sufficient for at least a portion of the lipids in the lipid containing tissue to dissolve in the solvent to thereby provide a liquid fraction and a solid fraction, separating the liquid fraction from the solid fraction, and removing the solvent from the liquid fraction to thereby recover a lipid rich component.

The method of the present invention may be applied to lipid containing tissues of any bird from which it is desirable to recover high quality lipids. Particularly preferred are methods supplied wherein the bird is a ratite, a gallinaceous bird or an anatidae (duck and geese family). Ratites include the emu, nandou, and ostrich, all of which have had oils used for their health benefits by aboriginals in Asia, Africa and South America.

As practiced commercially, the bird would be bled properly and the fat removed and cooled. Typically, the fat may be frozen to facilitate the handling of the tissue.

The step for comminuting the lipid containing tissues may be carried out by any conventional means. Thus, one would process the tissues at ambient temperatures. The tissues may be comminuted by means of a grinder or other suitable means.

The comminuted lipid containing tissues would then be subjected to extraction using a suitable solvent. Particularly preferred are acetone and ethyl acetate. The extraction would be done at a relatively low temperature and preferably between 4° C. and 25° C. The temperature is not a critical parameter; a higher temperature will increase the ambient level of the vapors of the solvent.

The volume/weight ratio of solvent to the lipid containing tissues may vary. Generally, the solvent tissue volume/weight ratio should be at least 3:1 and a preferred ratio is between 3:1 and 9:1.

Preferably, the solvent tissue mixture is agitated and any suitable means may be employed—a container equipped with agitation paddles as is well known in the art will ensure an efficient mixing.

The extraction time period may vary; generally, a period of time greater than 20 minutes has been found to be required.

Following, the extraction, the liquid fraction and solid fraction need to be separated. Again, many apparati are known in the art and to this end, one may use an apparatus for centrifuge. Alternatively, filtration could be utilized and in some instances, a combination of the methods can be appropriate—i.e. an initial centrifuge followed by a filtration. It would also be possible, where time is not a factor, to utilize sedimentation.

Following the separation of the liquid fraction and the solid fraction, the solvent will be removed to provide a lipid rich component. The solvent may be removed by known methods, including, for example, flash evaporation, straight evaporation or spray drying. The step may be practiced either in batches or on a continuous basis. The temperature can be increased up to approximately 125° C. for a very limited period of time. This will ensure the sterilization of the oils and during a limited period of time, will minimize chemical changes in the lipids. To minimize oxidation, one could perform the step in a nitrogen atmosphere.

Optionally, one can add an antioxidant to the liquid fraction to minimize lipid oxidation. Alternatively, the antioxidant could be added after removal of the solvent. Still further, an antioxidant could be added during the extraction step. Any number of food grade antioxidants are known in the art.

Optionally, after separating the liquid fraction and the solid fraction, one may wash the solid fraction with a solvent.

Having thus generally described the invention, the following examples illustrate embodiments of the invention.

EXAMPLE 1

Lipid containing tissues from an emu were subjected to an extraction process wherein the extraction time and the solvent were varied as set forth in Table 1.

TABLE 1

Standardization of the extraction process with emu fat.

| Solvent | Vol/weight | Grinding | Time (hours) | Yield % |
|---|---|---|---|---|
| acetone | 9:1 | — | 20 | 37.5 |
| ethanol (2nd) | 4:1 | — | 1 | 2.6 |
| acetone | 9:1 | — | 18 | 39.6 |
| acetone | 9:1 | — | 18 | 45.8 |
| acetone | 9:1 | yes | 18 | *61.6 |
| acetone | 9:1 | yes | 18 | 75.4 |
| acetone | 9:1 | yes | 30 min | 38.2 |
| ethyl acetate | 9:1 | yes | 18 | 87.6 |
| ethyl acetate | 9:1 | yes | 30 min | 85.9 |
| ethyl acetate | 9:1 | yes | 30 min | 87.4 |
| Chlor:MeOH** | 10:1 | yes | 30 min | 78.5 |
| Chlor:MeOH | 10:1 | yes | 30 min | 80.0 |

Experiments were carried out in triplicate and variations between replicates were inferior to 5% of the highest value.
Experiments were carried out at 4° C.
Lipids were estimated by gravimetry.
*Presence of skin with adipose tissues.
**The method of Folch et al. (1957).

EXAMPLE 2

Lipid containing tissues of chicken were then subject to extraction as set forth in Table 2.

TABLE 2

Extraction of chicken fat

| Solvent | vol/weight | Yield % |
|---|---|---|
| acetone | 9:1 | 9.8 |
| acetone | 9:1 | 12.5 |
| ethyl acetate | 9:1 | *42.2 |
| ethyl acetate | 9:1 | 60.9 |

Experiments were carried out in triplicate. Variations between replicates were inferior to 5% of the highest value.
The extraction was performed at 4° C., for two hours.
Lipids were estimated by gravimetry.
*Presence of skin mixed with adipose tissues.

EXAMPLE 3

In this example, freshly ground lipid containing tissue from Peking duck was immersed in ⅕ of their weight of distilled water at a temperature of 65° C. and gently agitated for 30 minutes while maintaining the temperature constant. Fat was then separated from the solid and aqueous base by centrifuge. Volatile matter was eliminated by heating for 30 minutes at 130° C. under a nitrogen atmosphere. The yield of lipids as measured by gravimetry was 50.6%. The experiment was carried out in triplicate.

EXAMPLE 4

The lipid containing tissues of the Peking duck of Example 3 were mixed in a volume/weight ratio of 5:1 with ethyl acetate and were agitated gently for 30 minutes. The solvent was evaporated and the lipids measured by gravimetry. The yield was 67.5%.

The experiment was repeated with volume/weight ratios of 3:1 and 9:1 and approximately the same results were achieved.

EXAMPLE 5

The method of Folch et al, as previously discussed, was carried out on the same Peking duck tissue. A yield of 49.9% was achieved.

The lipids recovered in Example 4 were then analyzed and compared with a commercially refined oil commercially available from Dundee Co. The analysis is set forth in Table 4.

TABLE 4

Analysis of emu oil, comparison with commercial refined oil

| Specifications | Beaudoin-Martin | Commercial |
|---|---|---|
| Humidity | <0.05% | <0.05% |
| Peroxide value | 4.0–4.4 | <10 |
| Free fatty acids | 0.18 | <1.5 |
| Refractive index | 1,455 | 1,456–1,467 |
| Iodine values | 67–89 | 65–85 |
| Saponification values | 195–212 | 190–200 |
| Specific gravity | 0.909 | 0.897–0.920 |
| Microbiology col./ml | <10 | <10 |
| Cholesterol (%) | 0.04 | — |

Properties of emu oil are comparable to those of the refined oil on the market (Dundee Co). Criteria for comestibility of the AOCS are met.

We claim:

1. A method for the extraction of lipids from lipid containing tissue of a member of the bird species, said method comprising the steps of:

comminuting said lipid containing tissues;

placing said comminuted lipid containing tissue in a solvent for a period of time sufficient for at least a portion of said lipids in said lipid containing tissue to dissolve in said solvent to thereby provide a liquid fraction and a solid fraction;

separating said liquid fraction from said solid fraction; and removing said solvent from said liquid fraction to thereby recover a lipid rich component.

2. The method of claim 1 wherein said step of adding said solvent to said comminuted tissue comprises the step of adding a solvent selected from a group consisting of acetone and ethyl acetate.

3. The method of claim 2 wherein said member of the bird species is a ratite, a gallinaceous bird or an anatidae.

4. The method of claim 2 wherein said solvent is added to said comminuted fat containing tissue in a volume/weight ratio of at least 4:1.

5. The method of claim 2 wherein said solvent is added to said comminuted tissue in a ratio of between 4:1 and 15:1.

6. The method of claim 1 wherein said solvent is added to said comminuted tissue at a temperature of between 0° C. and 25° C. and maintained at said temperature range for said period of time.

7. The method of claim 1 wherein said step of removing said solvent comprises a step selected from the group consisting of flash evaporation, evaporation and spray drying.

8. The method of claim 1 wherein the step of separating said liquid fraction from said solid fraction comprises the step selected from the group consisting of filtration, centrifugal separation, and sedimentation.

9. The method of claim 1 further including the step of washing said solid fraction with a solvent prior to recovering said lipid rich component.

* * * * *